US009187118B2

(12) United States Patent
Pillai

(10) Patent No.: US 9,187,118 B2
(45) Date of Patent: Nov. 17, 2015

(54) METHOD AND APPARATUS FOR AUTOMOBILE ACCIDENT REDUCTION USING LOCALIZED DYNAMIC SWARMING

(75) Inventor: Unnikrishna Sreedharan Pillai, Harrington Park, NJ (US)

(73) Assignee: C & P TECHNOLOGIES, INC., Closter, NJ (US)

( * ) Notice: Subject to any disclaimer, the term of this patent is extended or adjusted under 35 U.S.C. 154(b) by 796 days.

(21) Appl. No.: 13/340,788

(22) Filed: Dec. 30, 2011

(65) Prior Publication Data

US 2013/0173114 A1    Jul. 4, 2013

(51) Int. Cl.
| | |
|---|---|
| *B62D 6/00* | (2006.01) |
| *B62D 5/04* | (2006.01) |
| *B62D 7/15* | (2006.01) |
| *B60T 8/1755* | (2006.01) |
| *B62D 15/02* | (2006.01) |
| *B60W 30/095* | (2012.01) |
| *B60W 30/16* | (2012.01) |
| *B60W 50/00* | (2006.01) |

(52) U.S. Cl.
CPC .............. *B62D 5/0463* (2013.01); *B60T 8/1755* (2013.01); *B60W 30/095* (2013.01); *B60W 30/16* (2013.01); *B62D 6/003* (2013.01); *B62D 6/008* (2013.01); *B62D 7/159* (2013.01); *B62D 15/026* (2013.01); *B60W 2050/0005* (2013.01); *B60W 2550/302* (2013.01); *B60W 2550/402* (2013.01); *B60W 2710/207* (2013.01); *B60W 2720/10* (2013.01); *B60W 2720/106* (2013.01); *B60W 2750/308* (2013.01)

(58) Field of Classification Search
CPC ........ B62D 6/00; B62D 5/0463; B62D 7/159; B62D 6/008; B62D 6/003; B60T 8/1755

USPC ........... 701/23–25, 41; 364/424.01, 443, 447, 364/460, 461; 342/29, 41, 95, 455
See application file for complete search history.

(56) References Cited

U.S. PATENT DOCUMENTS

| | | | | |
|---|---|---|---|---|
| 5,331,561 | A * | 7/1994 | Barrett et al. ................... | 701/23 |
| 5,572,449 | A * | 11/1996 | Tang et al. ..................... | 700/304 |
| 6,665,603 | B2 * | 12/2003 | Jindo et al. ..................... | 701/96 |
| 6,675,081 | B2 * | 1/2004 | Shuman et al. ................. | 701/48 |
| 6,882,923 | B2 * | 4/2005 | Miller et al. .................... | 701/96 |
| 7,979,172 | B2 * | 7/2011 | Breed .............................. | 701/23 |
| 7,979,173 | B2 * | 7/2011 | Breed .............................. | 701/23 |
| 2007/0288132 | A1 | 12/2007 | Lam | |
| 2008/0320087 | A1 | 12/2008 | Horvitz | |
| 2009/0076673 | A1 * | 3/2009 | Brabec ............................ | 701/23 |
| 2009/0088941 | A1 * | 4/2009 | Tsuchiya et al. ................ | 701/93 |
| 2009/0234859 | A1 * | 9/2009 | Grigsby et al. ................. | 707/10 |
| 2009/0319096 | A1 | 12/2009 | Offer | |
| 2010/0106356 | A1 * | 4/2010 | Trepagnier et al. ............ | 701/25 |

(Continued)

*Primary Examiner* — James Trammell
*Assistant Examiner* — Majdi Alsomiri
(74) *Attorney, Agent, or Firm* — Walter J. Tencza, Jr.

(57) ABSTRACT

A method, system, and apparatus to detect when one or more moving vehicles are close to a first vehicle, and to take necessary actions to maintain a minimum distance between vehicles in a dynamic environment by automatic navigation. A computer method and apparatus for automobile accident reduction by maintaining a minimum distance with respect to all nearby vehicles on the road. In addition, methods to synchronously move a group of vehicles on a highway through a swarming action where each vehicle keeps a region immediately around it free of other vehicles while maintaining the speed of the vehicle immediately in front or nearby is also disclosed.

28 Claims, 12 Drawing Sheets

(56) References Cited

U.S. PATENT DOCUMENTS

| | | | |
|---|---|---|---|
| 2010/0188265 A1* | 7/2010 | Hill et al. | 340/905 |
| 2010/0217494 A1* | 8/2010 | Heft et al. | 701/70 |
| 2010/0253539 A1* | 10/2010 | Seder et al. | 340/903 |
| 2010/0256835 A1* | 10/2010 | Mudalige | 701/2 |
| 2010/0256836 A1* | 10/2010 | Mudalige | 701/2 |
| 2010/0256852 A1* | 10/2010 | Mudalige | 701/24 |
| 2011/0285982 A1* | 11/2011 | Breed | 356/4.01 |
| 2012/0035788 A1* | 2/2012 | Trepagnier et al. | 701/3 |
| 2012/0059574 A1* | 3/2012 | Hada | 701/119 |
| 2012/0083964 A1* | 4/2012 | Montemerlo et al. | 701/26 |
| 2012/0089299 A1* | 4/2012 | Breed | 701/36 |
| 2012/0106446 A1* | 5/2012 | Yousefi et al. | 370/328 |
| 2012/0116665 A1* | 5/2012 | Aoki et al. | 701/301 |

* cited by examiner

METHOD AND APPARATUS FOR AUTOMOBILE ACCIDENT REDUCTION USING LOCALIZED DYNAMIC SWARMING

FIELD OF THE INVENTION

This invention relates to improved methods and apparatus concerning automobiles and automobile accident prevention.

BACKGROUND OF THE INVENTION

Various methods and apparatus are known for preventing automobile accidents. Accidents happen when two moving objects collide, or the distance between two objects reduces to zero, with the "intensity" of the accident depending upon vehicle speed, orientation and road conditions among other things. Going through a red light, accelerating towards a post, not stopping at "STOP" signs, can all lead to accidents. For example, running through a red light can cause collision with another approaching vehicle that has a green light. A method and system to detect these situations, and take necessary actions to maintain a minimum distance between vehicles in a dynamic environment by automatic navigation is proposed in this invention. Prior art in this context is the ABS (Automatic Braking System), now universally adopted in almost all modern vehicles, where depending on the road traction in hostile weather conditions, the onboard computer takes over the braking procedure which helps avoid losing control of the vehicle on the road. Mercedes (trademarked), BMW (trademarked), and other companies have configured small radars into the chassis of some of their models to sense the distance to the closest neighbor (vehicle in front) and engage brakes automatically to avoid a collision.

SUMMARY OF THE INVENTION

One or more embodiments of the present invention relate to a computer method and apparatus for automobile accident reduction by maintaining a minimum distance with respect to all nearby vehicles on the road.

One or more embodiments of the present invention provides a computer/micro-processor on board each vehicle which is programmed by computer software to create two virtual regions around each vehicle. The two virtual regions may be an inner region such as an elliptical region specified by a measure such as a radius, and an outer circle (known as the swarm circle) of a larger radius. Both regions may be centered around each vehicle, completely envelope the each vehicle and move along with each vehicle. Using small radars on board and other communication devices for a sensing device the on board computer processor or micro processor is programmed by computer software to determine the distance and speed of all vehicles (incoming as well as along track) within its swarm circle and the computer processor or micro processor is programmed to make necessary adjustments and corrections to its own speed and steering so that no vehicles are allowed to enter within its inner region. These corrections may include steering left or right in prescribed steps, accelerating, decelerating, or a combination thereof, to keep a particular vehicle's inner region free of any other vehicle or object. The above steps are done in a periodic manner when the vehicle is in motion in addition to all other routine operations associated with a moving vehicle.

If at any instant other vehicles present in a particular vehicle's swarm circle are also equipped with similar swarming devices, the computer processor of the vehicles within the swarm circle are programmed to communicate with each other and a common pre-determined protocol as programmed by computer software will decide the combined movement of the vehicles involved in the swarm so as to maintain each of their inner regions free of other vehicles and objects. As the vehicles pass by, new swarming relations are acknowledged through onboard "computer handshakes" and dynamic course correction is maintained to keep the inner regions of each vehicle free of other objects and vehicles.

In another embodiment of the present invention color sensitive sensors or other types of sensors detect green/yellow/red lights and their distances on the road and convey that information to the onboard computer processor that may also have the location information of all traffic lights from roadside markings, GPS readings and other means. In the case when a red light is detected, the onboard computer processor is programmed to initiate a routine to bring the vehicle to a complete stop, if the driver doesn't begin the "bring to a stop" routine within a prescribed distance to the light. The distance required to bring the vehicle to a complete stop depends on the speed of the vehicle.

In another embodiment of the present invention, sensors on the vehicle detect "STOP" signs on the road side and the onboard computer or computer processor is programmed to initiate a "bring to a stop" procedure similar to the one described above, unless the driver does not initiate the bring to a stop procedure.

In another embodiment of the present invention, sensors on the vehicle detect other non-moving objects such as trees and poles on the road side and the onboard computer processor is programmed to initiate a "move to the right, move to the left or bring to a "STOP" procedure so as to avoid the object coming within the inner region of the vehicle.

In another embodiment of the present invention, if other vehicles present in a vehicle's swarm circle and moving in the same direction are also equipped with similar swarming computer devices, these computers communicate with each other and a common pre-determined protocol will decide the combined movement of the vehicles involved in the swarm so as to maintain each of their inner regions free of other vehicles and objects, and synchronize all the vehicles together so that they move as a pack following a lead vehicle simulating an active forward swarm pack similar to a flock of birds flying together.

In another embodiment of the present invention, the active swarm concept can be propagated across the swarming region of each vehicle, thus linking vehicles across multiple swarming regions and making all of them effectively connected together to move as a single pack. As an example, a pack of active forward swarms can be generated from a single first vehicle on interstate highway "5" in California going south from San Francisco to Los Angeles, and as this vehicle cruises along the highway, a second vehicle with the same destination that is within the swarming circle of the first vehicle, communicating with the first vehicle and realizing its destination matches or partially matches with the first vehicle, adjusting its velocity to match that of the first vehicle and joins the swarm moving together. As more vehicles are added to this swarm and they move together, although the various swarm circles of these vehicles overlap, as new vehicles are added, it is possible that the swarm circles of these latest vehicles do not overlap with the swarm circles of the first or second vehicle. Nevertheless each vehicle communicates with all other vehicles within its swarm and because of the overlap of various swarms, all vehicles stay connected even across non-overlapping swarms thus forming an active forward swarm. The pack can grow or shrink as other vehicles join or leave the pack. At any point, any vehicle can get in or get out of the active forward swarm and move individually or get off the highway. In particular, in addition to keeping the inner region of each vehicle free of other vehicles, when the vehicles are in an active forward swarm (AFS) mode, they synchronize their velocity with their nearest forward neighbor, or lead vehicle. In accordance with the present invention, AFS is an option that can be offered in motor vehicles, similar to the way a cruise control option is offered in modern day vehicles.

In one or more embodiments of the present invention a method is provided which may include measuring a first distance from a first vehicle to a second vehicle, storing a first quantity indicating the first distance in a first computer memory, measuring a first speed of the second vehicle with the first sensing device, storing a second quantity indicating the first speed in the first computer memory, and using a first computer processor to control a first steering control device to steer the first vehicle either to the left or to the right based at least in part on the first quantity and the second quantity.

In another embodiment, the method may include using the first computer processor to cause the first vehicle to either accelerate or decelerate based at least in part on the first quantity and the second quantity.

The first computer processor may control the first steering control device to steer the first vehicle either to the left or to the right, in a manner to maintain at least a first predetermined distance between the first vehicle and the second vehicle.

The first computer processor may cause the first vehicle to accelerate or decelerate in a manner to maintain at least a first predetermined distance between the first vehicle and the second vehicle.

In another embodiment, the method may include measuring a second distance from the first vehicle to a third vehicle using the first sensing device, storing a third quantity indicating the second distance in the first computer memory, measuring a second speed of the third vehicle with the first sensing device, storing a fourth quantity indicating the second speed in the first computer memory, and using the first computer processor to control the first steering control device to steer the first vehicle either to the left or to the right based at least in part on the third quantity, and the fourth quantity. The method may also include using the first computer processor to cause the first vehicle to either accelerate or decelerate based at least in part on the third quantity, and the fourth quantity.

In another embodiment, a method is provided which includes measuring a second distance from the second vehicle to the first vehicle, storing a fifth quantity indicating the second distance in a second computer memory, measuring a second speed of the first vehicle with a second sensing device, storing a sixth quantity indicating the second speed in the second computer memory; and using a second computer processor to cause the first vehicle to either accelerate or decelerate based at least in part on the fifth quantity and the sixth quantity.

In another embodiment, the first computer processor may cause a first communication signal to be transmitted from the first vehicle to the second vehicle, wherein the first communication signal provides data to the second vehicle which causes the second vehicle to accelerate or decelerate or causes the second vehicle to be steered to the right or to the left.

In another embodiment, when the second vehicle and the first vehicle are travelling on the same road, and in substantially the same direction; and the second vehicle is ahead of the first vehicle on the road, the method may further include using the first computer processor to cause the first vehicle to travel at substantially the first speed of the second vehicle, so that the first vehicle maintains a substantially fixed predetermined distance from the second vehicle while the first vehicle and the second vehicle are travelling on the road.

In at least one embodiment, an apparatus is provided which may include a first computer processor; a first sensing device; a first steering control device; and a first computer memory. The first computer processor may be programmed to: cause the first sensing device to measure a first distance from a first vehicle to a second vehicle; store a first quantity indicating the first distance in the first computer memory; cause the first sensing device to measure a first speed of the second vehicle; store a second quantity indicating the first speed in the first computer memory; and control the first steering control device to steer the first vehicle either to the left or to the right based at least in part on the first quantity and the second quantity and/or cause the first vehicle to either accelerate using the acceleration device or decelerate using the deceleration device based at least in part on the first quantity and the second quantity.

In another embodiment, the apparatus may include a transmitter. The first computer processor may be programmed to cause a first communication signal to be transmitted from the first vehicle via the transmitter to the second vehicle, wherein the first communication signal provides data to the second vehicle which causes the second vehicle to accelerate or decelerate and/or which causes the second vehicle to be steered to the left or to the right.

In another embodiment, the first computer processor may be programmed so that when the second vehicle and the first vehicle are travelling on the same road, in substantially the same direction, and the second vehicle is ahead of the first vehicle on the road, the first computer processor may cause the first vehicle to travel at substantially the first speed of the second vehicle, so that the first vehicle maintains a substantially fixed predetermined distance from the second vehicle while the first vehicle and the second vehicle are travelling on the road.

DETAILED DESCRIPTION OF THE DRAWINGS

Figure 1A:
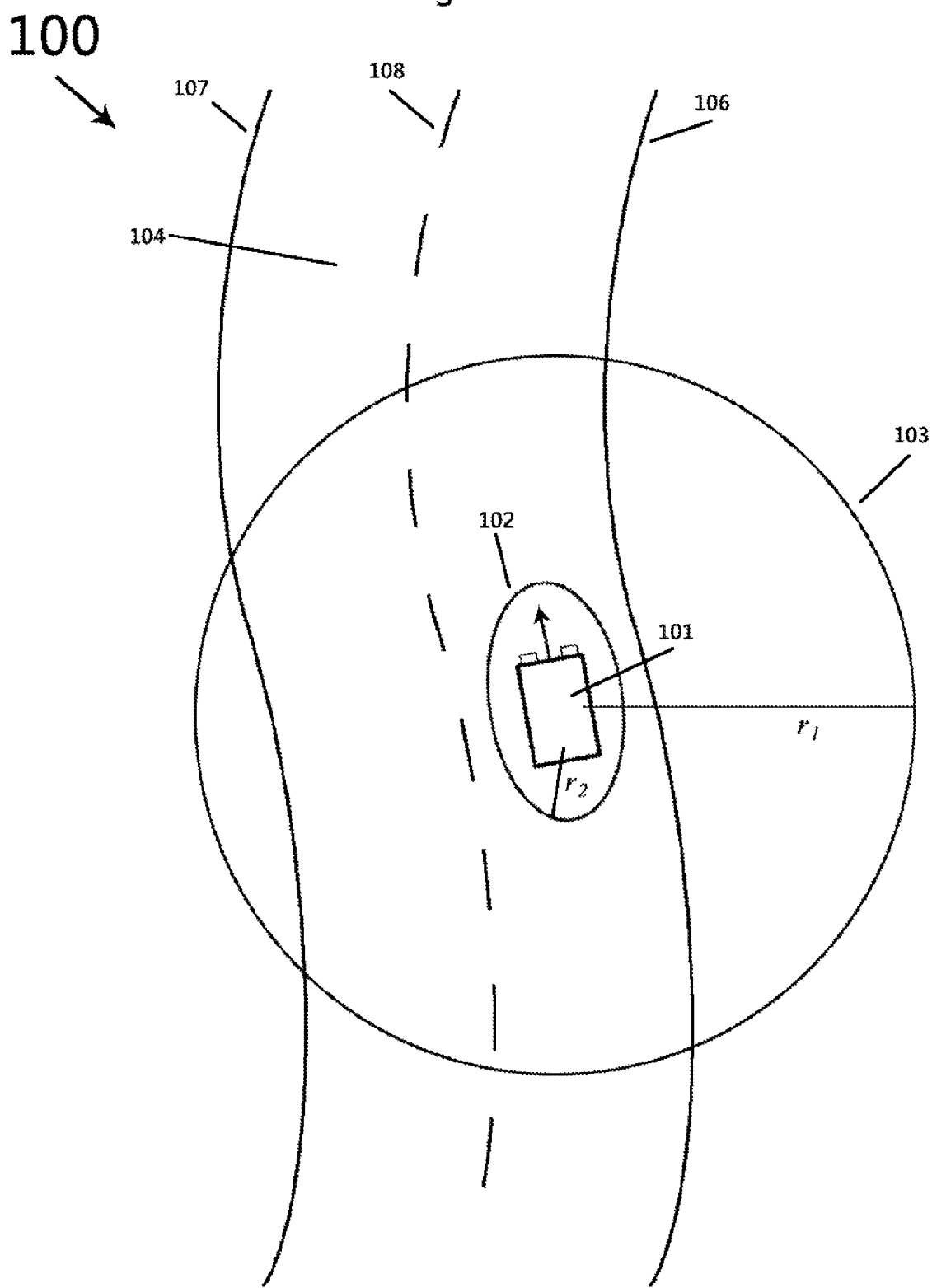
FIG. 1A illustrates a moving vehicle with its inner region and swarm circle shown.

FIG. 1A illustrates a diagram 100 of a moving vehicle 101 with its inner region 102 and swarm circle 103 shown. The swarm circle 103 has a radius $r_1$, which may be, for example, about one eight of a mile to one mile. The center of the swarm circle 103 may be the center of the vehicle 101. The inner region 102, may be circular or elliptical, and may have a radius of $r_2$. The center of the inner region 102 may be the center of the vehicle 101. In at least one embodiment, the swarm circle 103 and the inner region 102 move with the vehicle 101 so that the center of the vehicle 101 is the center of the swarm circle 103 and the inner region 102.

Figure 10:
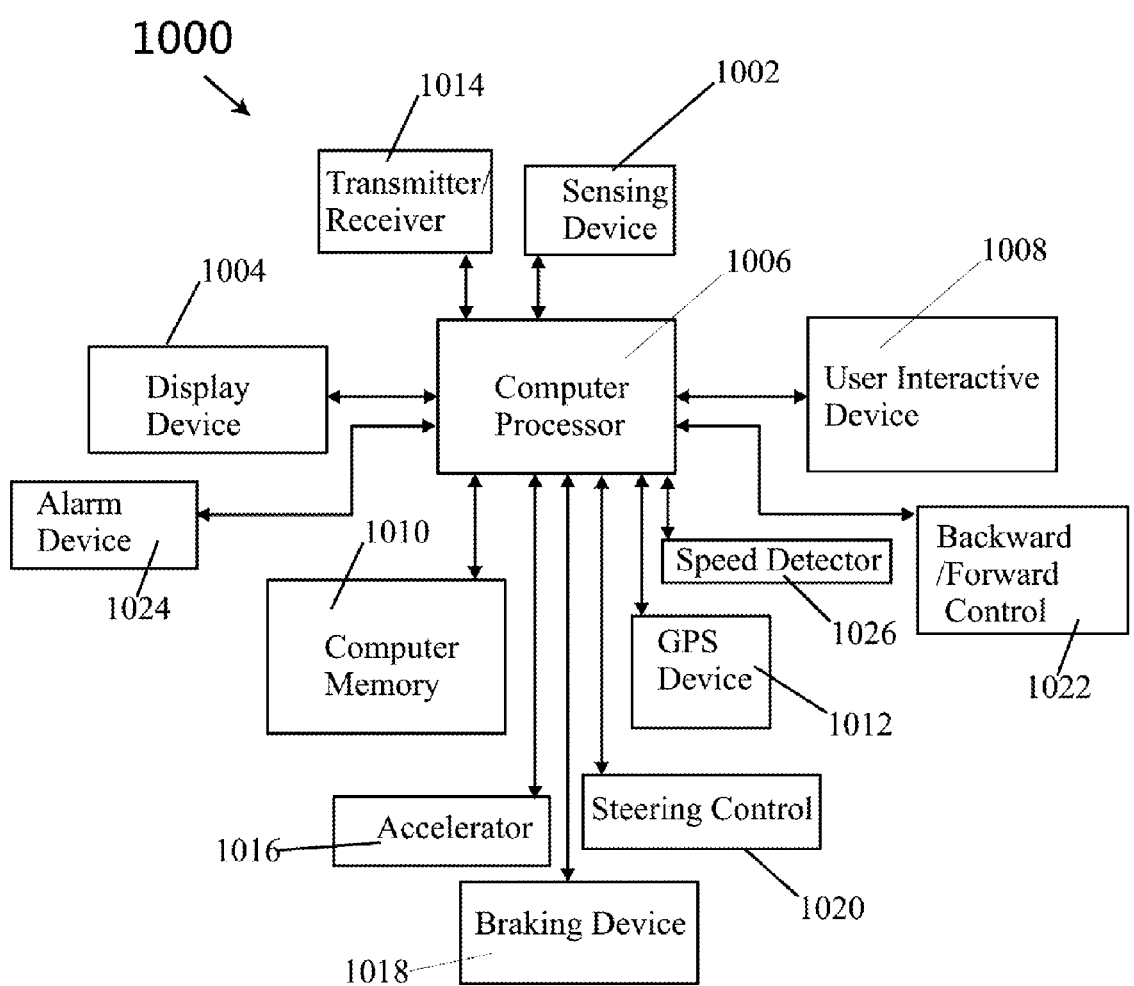
FIG. 10 shows an onboard apparatus in accordance with an embodiment of the present invention which may be located in a vehicle.

FIG. 10 shows an apparatus 1000 in accordance with an embodiment of the present invention which may be located in or onboard a vehicle, such as vehicle 101. The apparatus 1000 includes a sensing device 1002, display device or computer monitor 1004, computer processor 1006, user interactive device 1008, computer memory 1010, global positioning device 1012, a transmitter/receiver 1014, an accelerator 1016, a braking device 1018, a steering control 1020, a backward/forward control device 1022, an alarm device 1024, and a speed detector 1026.

The diagram 100 also includes a road 104. The road 104 includes road side boundaries 107 and 106, and dividing line 108. The dividing line 108 may be a solid yellow dividing line (although shown in black and white, and dashed in drawings) that may divide traffic going in a first direction (such as between 108 and 106) and traffic going in a second direction which is opposite the first direction (such as between 108 and 107). Alternatively, the dividing line 108 may divide lanes of a highway moving in the same direction.

The inner region 102 is a region in which no other vehicles are allowed, except vehicle 101. The computer processor 1006 is programmed by computer software stored in computer memory 1010 to prevent vehicles other than 101 from entering inner region 102, while the vehicle 101 is in motion. The computer processor 1006 does this in an dynamic environment as other vehicles move in and out of the swarm circle 103 that is moving along with the vehicle of interest, in this case vehicle 101, typically with the same velocity of the vehicle 101.

One or more embodiment of the present invention present a method and an apparatus for accident reduction on a vehicle by maintaining a minimum distance with respect to nearby vehicles on the road either by acting on inputs provided by an onboard computer processor, such as the computer processor 1006 in FIG. 10 in the particular vehicle, such as vehicle 101 in FIG. 1A or by acting on inputs provided by other computer processors of other vehicles within its swarm circle. A swarm circle is a virtual circle, such as swarm circle 103, drawn with its center at the center of the vehicle of interest, such as 101 and of certain radius, such as R1, such as fraction of a mile or one mile.

Figure 1B:
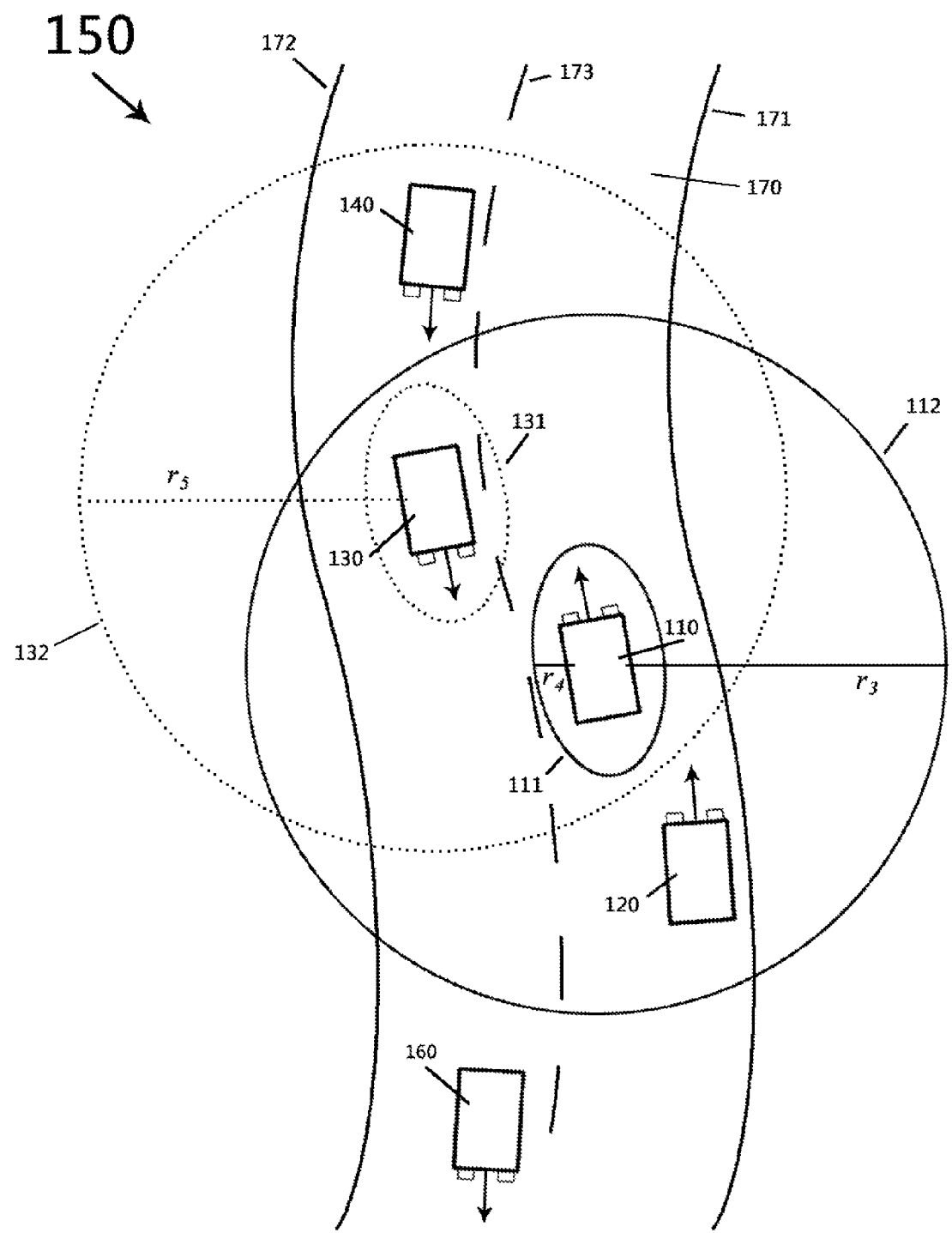
FIG. 1B illustrates a typical road condition with several vehicles within each swarm circle with two swarm circles (one solid and one dotted) shown.

FIG. 1B illustrates a diagram 150 of a typical road condition with vehicles 110, 120, 130, 140, and 160. The diagram 150 also shows a swarm circle 111 having a radius of $r_3$ for the vehicle 110, along with an inner region with radius $r_4$. A swarm circle 132 having a radius $r_5$ for the vehicle 130 is also shown. Inner regions or circles 131 and 111 for the vehicles 130 and 110, respectively, are also shown. The diagram 150 also includes a road 170 having boundaries 171 and 172 and a center line 173. No other vehicles or objects are allowed within each vehicle's inner region (disregarding objects located on or within the particular vehicle).

Figure 11:
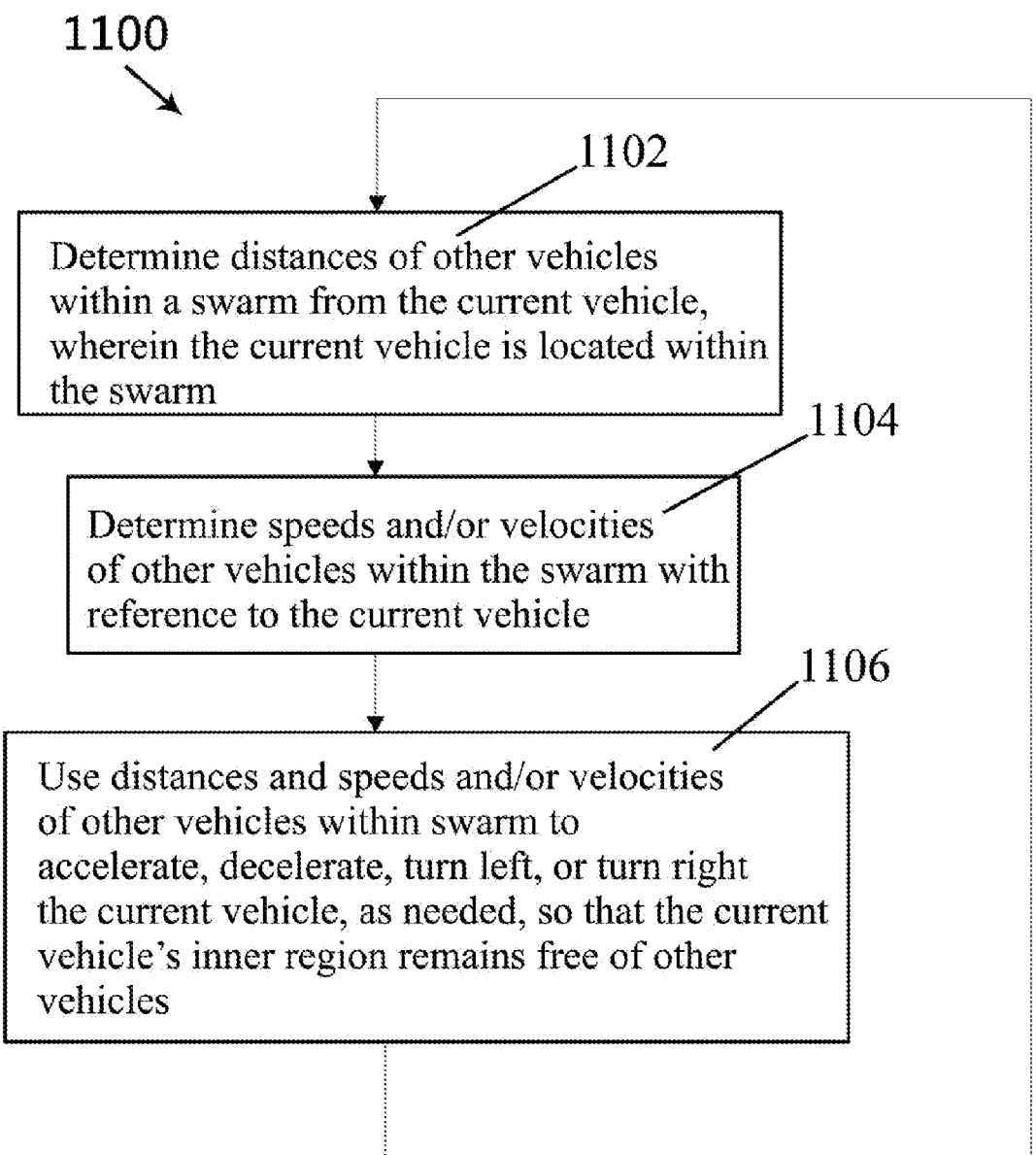
FIG. 11 shows a flow chart of a method in accordance with an embodiment of the present invention.

FIG. 11 shows a flow chart 1100 of a method for monitoring a controlling a current vehicle, such as vehicle 110, so that its inner region remains free of other vehicles. The method shown by FIG. 11 can be executed by computer processor 1006 on board the vehicle 110 and can also be executed by a computer processor (analagous to, identical to, or similar to computer processor 1006) on every other vehicle.

The vehicles within each vehicle's swarm circle are actively monitored by the onboard computer processor (such as computer processor 1006 shown in FIG. 10) by using an onboard radar device to measure the distances to these vehicles, such as at step 1102 in FIG. 11 and their speeds and/or velocities, such as at step 1104 in FIG. 1. The distances, speeds, and/or velocities may be determined by an onboard radar device or other sensing device which may be part of sensing device 1002. At step 1106 the distances, speeds and/or velocities may be used by a computer processor, such as computer processor 1006 to accelerate, decelerate, turn left, or turn right a vehicle such a vehicle 110. These actions, which may be caused by the computer processor 1006 may include accelerating a vehicle, such as vehicle 110 by using causing accelerator 1016 to accelerate the vehicle 110, decelerating a vehicle, such as vey causing braking device 1018 to be activated, moving left or moving right a vehicle, such as by causing steering control 1020 to be appropriately activated to steer a vehicle, such as 110 to the left or to the right in controlled steps while monitoring the distances to nearby vehicles, using devices which may be part of sensing device 1002, and using the distances to nearby vehicles from sensing device 1002 as feedback. The feedback in terms of the new distances, speeds, and velocities other vehicles, with reference to a current vehicle (such as 110) is used to decide on the action at a next clock cycle, typically of the computer processor 1006. As shown in FIG. 11, a feedback loop is provided, so that the distances, speeds, and/or velocities are determine again, and the vehicle (such as 110) it accelerated, decelerated, turned left, and/or turned right depending on the results of the next set of measurements of distances, speeds, and/or velocities.

The swarm circle 112 for vehicle 110 at the specific instant shown in FIG. 1B has two other vehicles within itself—vehicle 120 traveling along with vehicle 110, and vehicle 130 traveling in the opposite direction to vehicle 110. Similarly the swarm circle 132 for vehicle 130 at the same instant shown in FIG. 1B has two other vehicles within it—vehicle 110 and vehicle 140.

Some or all of the vehicles within each swarm circle may have the onboard apparatus 1000 shown in FIG. 10, or an apparatus substantially similar to or identical to the apparatus 1000 of FIG. 10. The computer processors of vehicles having identical or substantially similar apparatus 1000 may communicate with each other via high frequency radio communication or bluetooth devices which may be part of transmitter/receiver 1014 of FIG. 10, and may follow the same protocol through computer programming of their computer processors and take a collective action to keep the inner regions of all those vehicles free of any other vehicles. This constitutes an active swarming behavior. Moreover this decision making can be achieved across multiple swarm circles as well.

For example, if vehicles 110, 120, 130, 140 all have an apparatus 1000 or an apparatus substantially similar to or identical to apparatus 1000, vehicles 110 and 130 may decide the next best move is for vehicle 130 to slow down, in which case vehicle 130 requests vehicle 140 to slow down. This may be done by the computer processor 1006 of vehicle 130 causing the transmitter/receiver 1014 to transmit a signal to a receiver portion of a transmitter/receiver on vehicle 140, which may be identical to 1014. The vehicle 140 may have a computer processor similar to or identical to computer processor 1006. The vehicle 140's computer processor (analagous to 1006) may process the signal received from vehicle 130 and the vehicle 140 may cause a braking device or deceleration device (analagous, substantially similar to, or identical to 1018) to cause the vehicle 140 to slow down.

Thus, in the above example. the vehicle 110 has effectively (indirectly through computer processor of vehicle 130) asked vehicle 140 to slow down across swarm circles, i.e. even though vehicle 140 is not in the swarm circle 112 of vehicle 110, vehicle 110 has indirectly (through computer processor of vehicle 130) effectively asked vehicle 140 to slow down. In this sense the group behavior and awareness exhibited by vehicles in a swarm are similar to a pack of wolves moving together, a flock of birds flying together, or a school of fish swimming together. In each case the collective behavior and their awareness generates the active swarm concept. In the present context, the swarms are formed dynamically since the swarm will contain both incoming and outgoing vehicles with different speeds and directions and hence they are together only for short durations. A clocking system or device which may be part of computer processor 1006 and analagous computer processors in each vehicle updates the local scene and forms a current swarm of vehicles, which may be stored in computer memory such as computer memory 1010 and issues commands collectively, when applicable, to keep the inner regions of all those vehicles free of other objects.

In the event when some or all other vehicles in the current swarm are not equipped with apparatus 1000 of one or more embodiments of the present invention, the computer processor, such as 1006, onboard the current vehicle, such as for example vehicle 110, is programmed by computer software to issue commands to itself to make the appropriate moves such as accelerate (and 1006 provides a signal to accelerator 1016 to cause the vehicle 100 to accelerate) decelerate (and 1006 provides a signal to braking device 1018 to cause the vehicle 100 to decelerate) (and, turn left, turn right, and 1006 provides a signal to steering control 1020 to turn the current vehicle, on which 1006 is located, left or right) so as to maintain its inner region, such as inner region 111, free of other moving vehicles. This constitutes the passive swarming behavior. As clocks are updated, some or all of the vehicles within the swarm circle 112 of vehicle 110 will move out of the swarm circle 112 and new vehicles will enter and the above procedure is repeated either using an active swarming method as described above where the computer processors on vehicles within a swarm circle communicate with each other (such as via transmitter/receiver 1014 and similar or identical transmitter/receivers on other vehicles) and make decisions to keep the inner regions of each vehicle free of other moving vehicles, or a passive swarming method where the computer processor within each vehicle makes decisions about turning its vehicle (on which the particular computer processor is located) left or right to keep its own inner region free of other moving vehicles, or a combination thereof when applicable.

Figure 2:
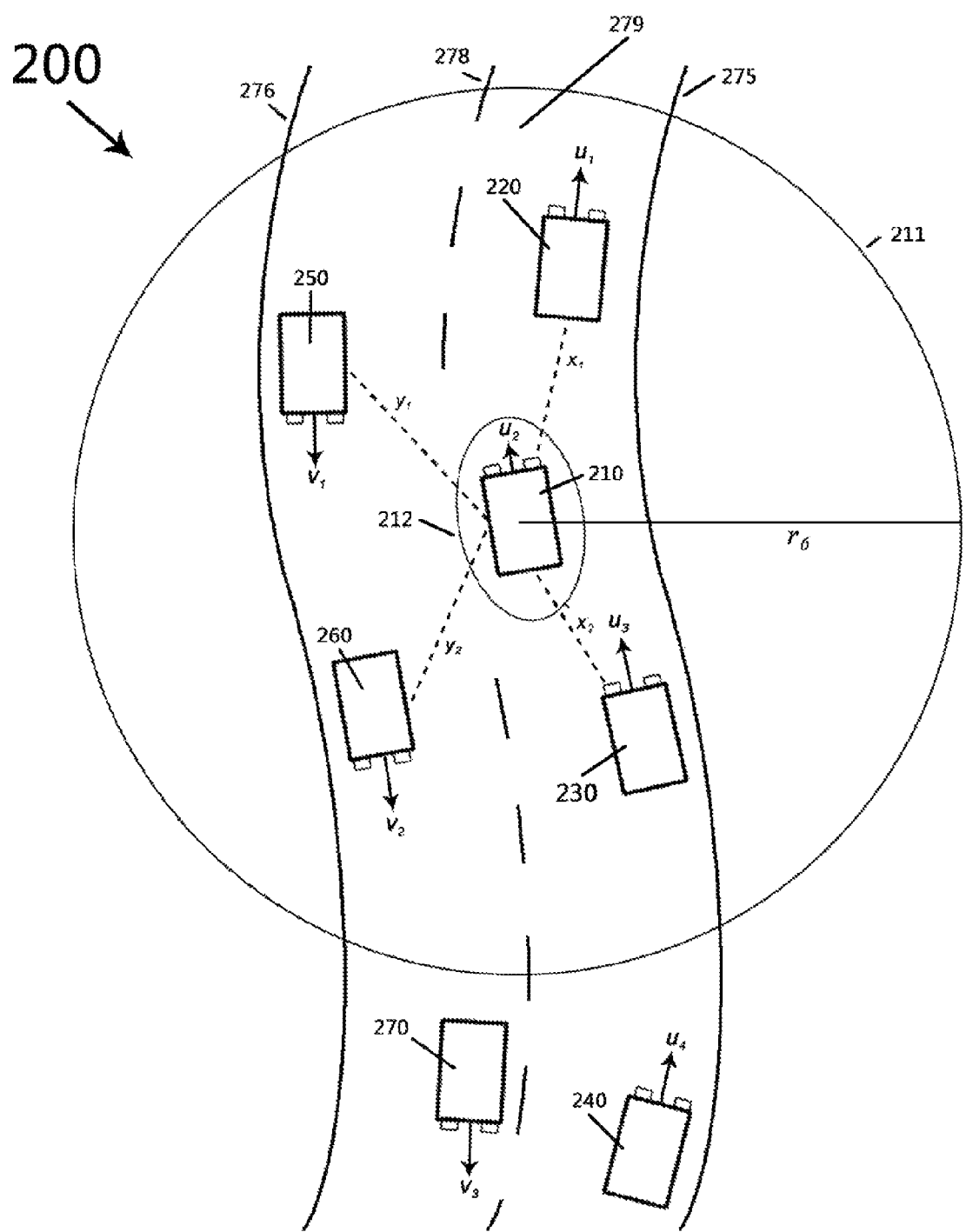
FIG. 2 illustrates a typical vehicle measuring the distances and velocities of all other vehicles within its swarm circle.

FIG. 2 illustrates a diagram 200 of a vehicle 210, which has an onboard apparatus, such as onboard apparatus 1000 shown in FIG. 10, which measures the distances and velocities of all other vehicles within its swarm circle, for example by using a radar device, such as a radar device which may be part of sensing device 1002.;

FIG. 2 shows a diagram 200 illustrating the vehicle 210 traveling with a velocity $U_2$ and its swarm circle 211 and its inner region 212. The swarm circle 211 has a radius $r_6$. The radius $r_6$ can vary depending on the location such as highways, or urban area and/or the vehicle speed. In a crowded urban setting, the radius $r_6$ may have a smaller value, such as several hundred meters whereas in an inter-state highway setting the radius $r_6$ may be several miles since the fewer vehicles there can be traveling at a faster speed compared to the urban area. The radius of these swarm circles will at times depend upon the number of vehicles that the onboard computer processor can handle; or may be decided by standard protocols that dictate these radius to be a certain value in urban areas, and some other larger value in rural highway settings. Using GPS and other roadside means it is easy for the onboard computer to know exactly where it is at any time and hence can determine the value of the swarm radius to be used.

The diagram 200 includes vehicles 210, 220, 230, 250, and 260 all of which are located in the swarm circle 211 of the vehicle 210 at the instant shown. The vehicles 240 and 270 are outside of the swarm circle 211.

Vehicles 210, 220, 230, and 240 move in substantially the same forward direction with velocities $u_1$, $u_2$, $u_3$ and $u_4$ respectively, whereas vehicles 250, 260, 270 move in substantially the same downwards direction, opposite the forward direction with velocities $v_1$, $v_2$ and $v_3$ respectively. Moreover the computer processors (analagous to 1006) and sensing devices (analagous to 1002) onboard each vehicle (such as vehicle 210) track the distances $x_1$, $x_2$, $x_3$ to all vehicles within its swarm circle through onboard distance sensing devices such as radars and store these distances in computer memory (analagous to computer memory 1010.

For the instant shown in FIG. 2, the distances tracked between vehicle 210 and the other vehicles in its swarm 211, include: (a) the distance, $x_1$ between vehicle 210 and 220, (b) the distance, $x_2$, between vehicle 210 and 230, (c) the distance, $y_1$ between vehicle 210 and 250, and (d) the distance, $y_2$, between vehicle 210 and 260. The distances (a) and (b) are distances between vehicle 210 and vehicles in its swarm circle 211 that are travelling in substantially the same forward direction. The distances (c) and (d) are distances between vehicle 210 and vehicles in its swarm circle 211 that are travelling in substantially the same downwards direction, opposite the forward direction.

The vehicles 210, 220, 230, and 240 may be travelling in the substantially same upwards direction with velocities $u_1$, $u_2$, $u_3$ and $u_4$, respectively. The vehicles 250, 260, and 270 may be travelling in the substantially same downwards direction with velocities $v_1$, $v_2$ and $v_3$ respectively.

The computer processors of each vehicle (such as computer processor 1006 of vehicle 210, for example) together with its sensing device (analagous to 1002) measure the locations and velocities of all vehicles using onboard radar devices—similar to the one currently used in most of the police vehicles to determine the speed of other vehicles on the road—within its swarm circle (such as swarm circle 211 for vehicle 210) at every instant and update this information at a specified clock rate that is determined by the computer processor of the particular vehicle (such as processor 1006 of vehicle 210). In a crowded scene such as a well moving urban traffic in a nearby highway, updating the above location and speed information about other vehicles within its swarm circle can happen at a faster rate depending on a variety of factors such as (a) how many vehicles are present in the swarm circle ay any instant, (b) the current location of the vehicle as determined by its GPS coordinates; In the case of (a), if there are a larger number compared to the usual average number of vehicles in any swarm, then the computer processor 1006 alerts related devices such as 1014 and 1020 to collect information at a faster clock rate, and take the appropriate actions also at a faster clock rate. If on the other hand, the number of vehicles within the swarm circle are smaller than the average number of vehicles, the computer processor 1006 slows down the data collection rate by skipping some clock cycles periodically. Similarly if (b) is used to determine the clock arte, when the vehicle approaches a crowed city such as New York or Los Angeles, the preloaded database will be cross checked by the computer processor against its current GPS location to determine the appropriate clock rate such as a faster rate in New York area vs. a slow rate in rural South Dakota.

Figure 3:
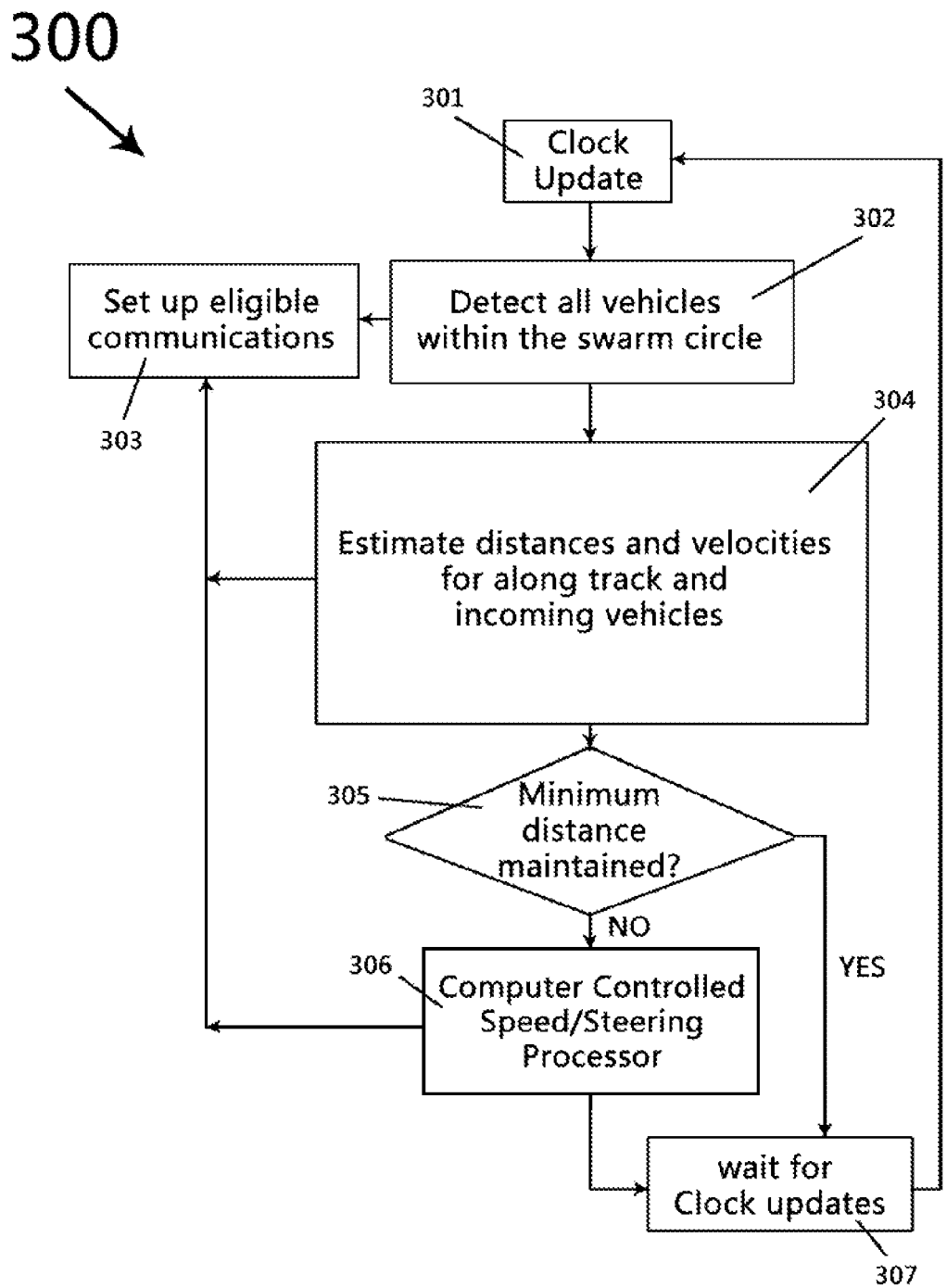
FIG. 3 is a flow chart of a routine or method which can be implemented by a computer processor programmed by computer software, wherein the routine enables localized dynamic swarming of a single vehicle.

FIG. 3 is a flow chart 300 of a routine or method that can be implemented by computer processor 1006 as programmed by computer software in computer memory 1010 to enable the localized dynamic swarming of a single vehicle, such as vehicle 210 in FIG. 2.

At step 301a clock of the computer processor of the particular vehicle, such as computer processor 1006 of the vehicle 210, is updated to count down at a pre-determined rate that can vary depending on traffic conditions. In crowded urban situations the clock cycle duration can be set smaller than that in a remote highway setting. For example, in and around a metropolitan area such as New York or Los Angeles, the clock rate at which sensing and decisions are made can be faster compared to rural areas in South Dakota or New Jersey suburban towns on a Sunday morning. Changing clock rate is physically achieved through the standard procedure such as having the main clock in the computer run at a high rate such as a millisecond and then step it down to any desired rate such as every second or one-tenth of a second and so on. The set clock rate can also depend on the velocity of the parent vehicle, such as vehicle 210 in FIG. 2 or other vehicles (such as vehicles 220, 230, 250, and 260 within the swarm, such as swarm circle 211. If an incoming vehicle (such as vehicle 240 in the diagram 200) is approaching at an unusually high speed, the clock rate may be updated to be faster so as to track the new vehicle and make decisions accordingly. The primary job of the onboard computer processors (such as computer processor 1006) and sensors (such as sensing device 1002) is to detect all vehicles within its current swarm circle at step 302 shown in FIG. 3 on every clock cycle. If the other vehicles in the current swarm circle (such as swarm circle 211) are equipped with the apparatus 1000, then communication links between the primary vehicle (such as 210) and other vehicles (such as 220, 230, 250 and 260) in the swarm circle 211 are established, such as via transmitter portion of the transmitter/receiver 1014. For example, primary vehicle (such as 210) may send a communication with a steering command such as "move right" via transmitter/receiver 1014 to a receiver portion of a transmitter/receiver (analagous to 1014) of vehicle 250. A computer procesor (analagous to computer processor 1006) may processed the received signal from the transmitter/receiver of 250, and may cause an accelerator (analagous to 1016 to accelerate), a braking device (analagous to 1018) to slow a vehicle down, or a steering control (analagous to 1020) to steer the vehicle 250 in a particular direction.

If no such communication made from vehicle 210 to other vehicles within swarm 211 is acknowledged, (for example) vehicle 210 next applies all corrections on its own vehicle 210 only. In the next step 304, the onboard computer processor (such as processor 1006) and sensing device 1002 measure all distances using standared onboard radar distance sensing devices of along-track and incoming vehicles within the swarm, such as 211, along with the velocities and of along-track and incoming velocities respectively for all vehicles within the current swarm circle, such as 211. All velocities of vehicles within the swarm, such as within swarm circle 211, are checked against local speed restrictions available through onboard stored maps, such as stored in computer memory 1010 and GPS location information from GPS device 1012 by the compute processor, such as 1006, as programmed by computer software stored in computer memory 1010. This information is passed on to to a minimum distance control box, which may be part of the computer processor, such as 1006, at step 305 that checks all distances against the inner region radius for the particular vehicle, such as vehicle 210. If distances, and of the moving vehicles within the swarm 211 exceeds the minimum distance requirement, then the computer processor, such as 1006, waits for the next clock update as shown in step 307. Otherwise the information about those vehicles not satisfying the above minimum distance requirement is passed on to speed/steering control box of the computer processor such as 1006, at step 306 which takes appropriate action in terms of speed adjustment or incremented automatic steering to maintain the inner region free of any other vehicle within the swarm, such as 211, and waits for the next clock cycle update in 307.

Figure 4:
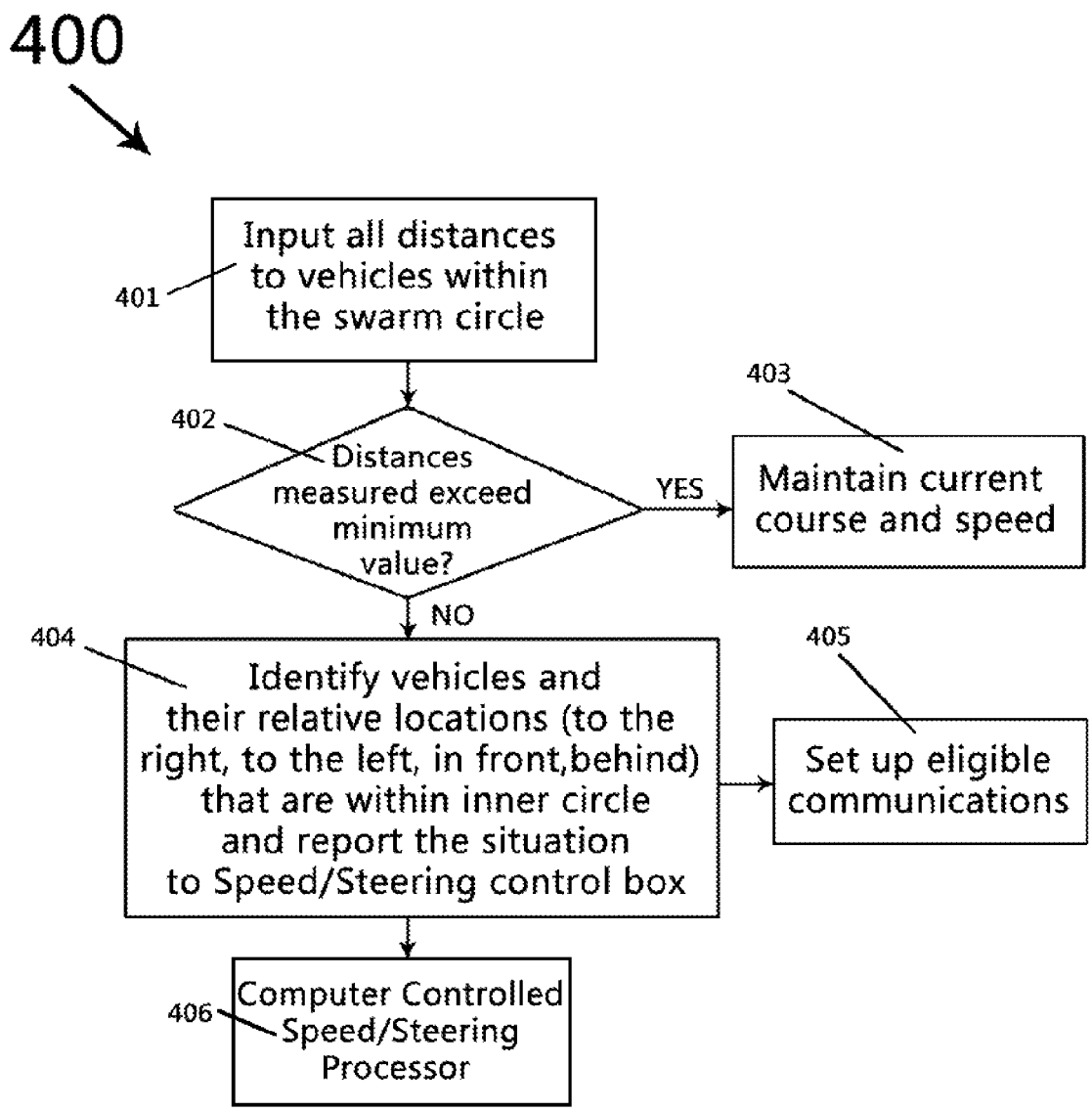
FIG. 4 is a flow chart of a minimum distance control method in accordance with an embodiment of the present invention.

FIG. 4 is a flow chart 400 of a minimum distance control method which can be implemented by the computer processor 1006 as programmed by computer software stored in computer memory 1010; to maintain the inner region, such as inner region 112 associated with its primary vehicle, such as vehicle 210, free of other vehicles. The computer processor, such as 1006, uses the distances and of all other vehicles (such as 220, 230, 250, and 260) within its swarm circle (such as 211) as the input for the computer processor, such as 1006, of the primary vehicle, such as 210 and verifies at every clock cycle through step 402 whether the inequalities $$x_i > r, i=1, 2, \quad (1)$$

and $$y_i > r, i=1, 2, \quad (2)$$

are all satisfied for every. Here represents the minimum distance that must be maintained between every pair of moving vehicles. If all the inequalities are satisfied, then step 402 leads to step 403 and the course is maintained. If the above inequalities are not satisfied for any, then step 402 leads to step 404, where these indices and associated vehicles are sorted out by the computer processor 1006 in the computer memory, such as 1010 along with their current locations. The difference and corresponding to these identified vehicles are the excess amount by which then vehicles encroach in to the inner region region of the vehicle associated with the computer processor, such as 1006. The locations and excess distances by which the other vehicles have come into the inner region of the current vehicle, such as 210, are used to decide whether the current vehicle, such as 210, should move to the right left, front or back by a certain amount and/or if the speed should be adjusted by a certain amount to facilitate the changes or a combination there of. The recommended move along with the location information for all the vehicles, such as 220, 230, 250, and 260 within its swarm circle 211 are passed on to the a speed/steering control of the computer processor 1006.

Figure 5:
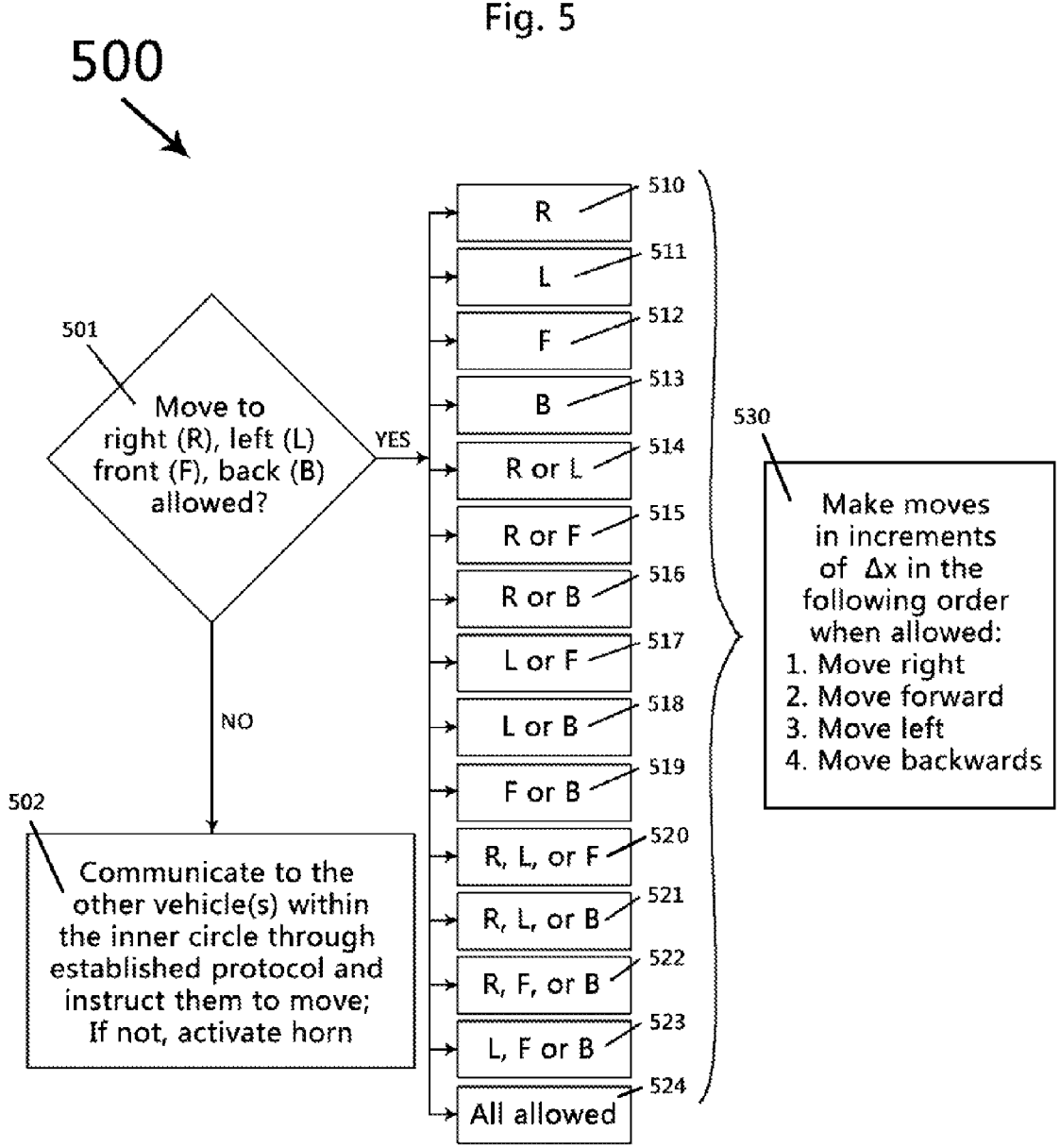
FIG. 5 is a flow chart of a speed/steering control method, which can be implemented by a computer processor programmed by computer software.

FIG. 5 is a flow chart 500 of a speed/steering control method which can be implemented by the computer processor 1006 as programmed by computer software stored in computer memory 1010.

The flow chart 500 is of a routine that enables the computer processor, such as 1006, to perform the necessary steering control (right, left, such as through steering control 1020 shown in FIG. 10) or motion (forward, backward, such as through forward or backward control 1022) and/or speed adjustment (such as through devices 1016 and 1018 of FIG. 10) to maintain the inner region, such as 212 associated with its vehicle, such as 210, free of other vehicles. For every clock cycle of a clock of computer processor 1006, the computer processor 1006 is programmed to check at step 501 which movements are allowed. For example if the vehicle, such as 210, is on an inner lane on a two lane highway then obviously "move left" is not allowed, and all other moves are acceptable so long as its inner region, such as inner region 212, is free of other vehicles. However if there is a vehicle on the right lane adjacent to it, then a move to the right is also not allowed. In that case, the computer processor 1006 slows down the vehicle 210, by for example sending a signal to the braking device 1018 to cause the vehicle 210 to slow down, and then moves right effectively making the "move to the right" motion.

Steps 511-524 lists various motion steps and their combination that may be allowed by the computer processor 1006 at that particular clock cycle. In steps 511-524, "R" stands for "right", "L" stands for "left", "F" stands for "forward", and "B" stands for "backward". Depending on the allowable moves, and the demand the computer processor 1006 uses a look up table stored in computer memory 1010 such as table 530 to make the next move. For example, if a "move to the right" is requested by the computer processor 1006, and if step 519 are the only combination of moves allowed (i.e. "F" forward or "B" backwards), then the computer processor 1006 will slow down going backwards just enough to execute the "move to the right" command subsequently, either in the same clock cycle, or during the next clock cycle depending on the vehicle speed or the primary vehicle, such as 210. If on the other hand, the computer processor 1006 determines at step 501 that no moves are allowed, then step 502 triggers step 503 that causes the computer processor 1006 to communicate with the other vehicles within its inner region, such as inner region 212, and instruct them to move, provided such a communication link exists, such as through transmitter/receiver 1014 of the primary vehicle, such as vehicle 210 to another vehicle, such as vehicle 220. If not, as a last resort, automatic sound alarms, such as alarm device 1024 (such as honking) may be generated by the computer processor 1006 to alert the other drivers.

Figure 6:
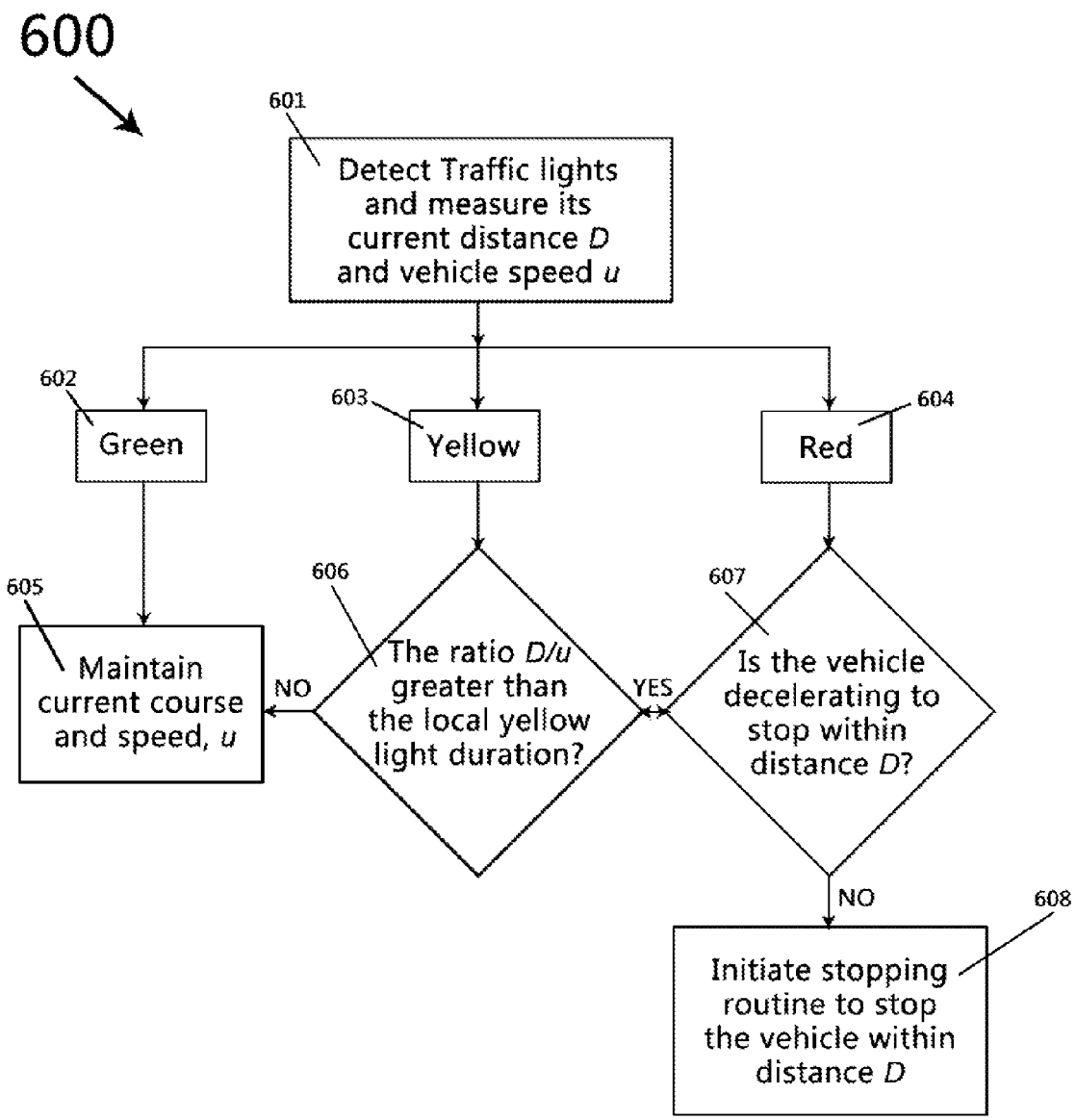
FIG. 6 is a flow chart of a method to bring a moving vehicle to a complete stop at a red/yellow traffic light.

FIG. 6 is a flow chart 600 of a method which can be implemented by the computer processor 1006 as programmed by computer software stored in computer memory 1010 to bring a moving vehicle, such as vehicle 210 in FIG. 2, to a complete stop at a red/yellow traffic light.

The flow chart 600 depicts a method or routine executed by the computer processor 1006 as programmed by computer software stored in the computer memory 1010 that enables the computer processor 1006 to perform safe passage for a vehicle, such as vehicle 210, through traffic lights. These lights may be equipped with light sensitive infra-red or similar devices to signal the Red/Yellow/Green lights. The onboard sensors or sensing device 1002 in FIG. 10, at step 601 detect traffic lights and measure the current distance to the lights. If the light is green, at step 602, the computer processor 1006 gives the go ahead to maintain the current course. If the light is yellow, at step 603, the computer processor 1006 requests a duration calculation at step 606. In that case, the computer processor 1006, at step 606, computes the ratio of the distance to traffic light to the vehicle speed of the vehicle 210, wherein the vehicle speed may be determined by the computer processor 1006 from the speed detector 1026. If this ratio exceeds the yellow light duration (five seconds or other similar number) then at step 607 the computer processor 1006 checks, such as by seeing whether a signal already was sent to to see whether vehicle, such as 210, is already decelerating to make a stop before the light is reached. The computer processor 1006 may determine that the vehicle 210 is decelerating by taking one velocity or speed from the speed detector 1026 at one time and another speed or velocity from the detector 1026 at another time and determining whether the vehicle 210 is accelerating or decelerating.

If the computer processor 1006 determines that the primary vehicle, such as 210 is decelerating, no further action is taken in this routine, if not at step 608 the computer processor 1006 initiates a routine or method to bring the primary vehicle, such as 210 to a complete stop before the traffic light is reached. If the above ratio is less than the yellow light duration, no action is taken and at step 605, the computer processor 1006 causes the vehicle to maintain speed by sending the appropriate signals to either the accelerator or the braking device 1018 as applicable. Finally if the light is red, at step 604, the computer processor 1006 conveys that information to a procedure at step 605 where the computer processor 1006 checks to see whether the primary vehicle, such as 210 is already decelerating to make a stop before the light is reached. If "Yes" no further action is taken; if no at step 608 the computer processor 1006 initiates a routine to bring the primary vehicle, such as 210 to a complete stop before the traffic light is reached.

Figure 7:
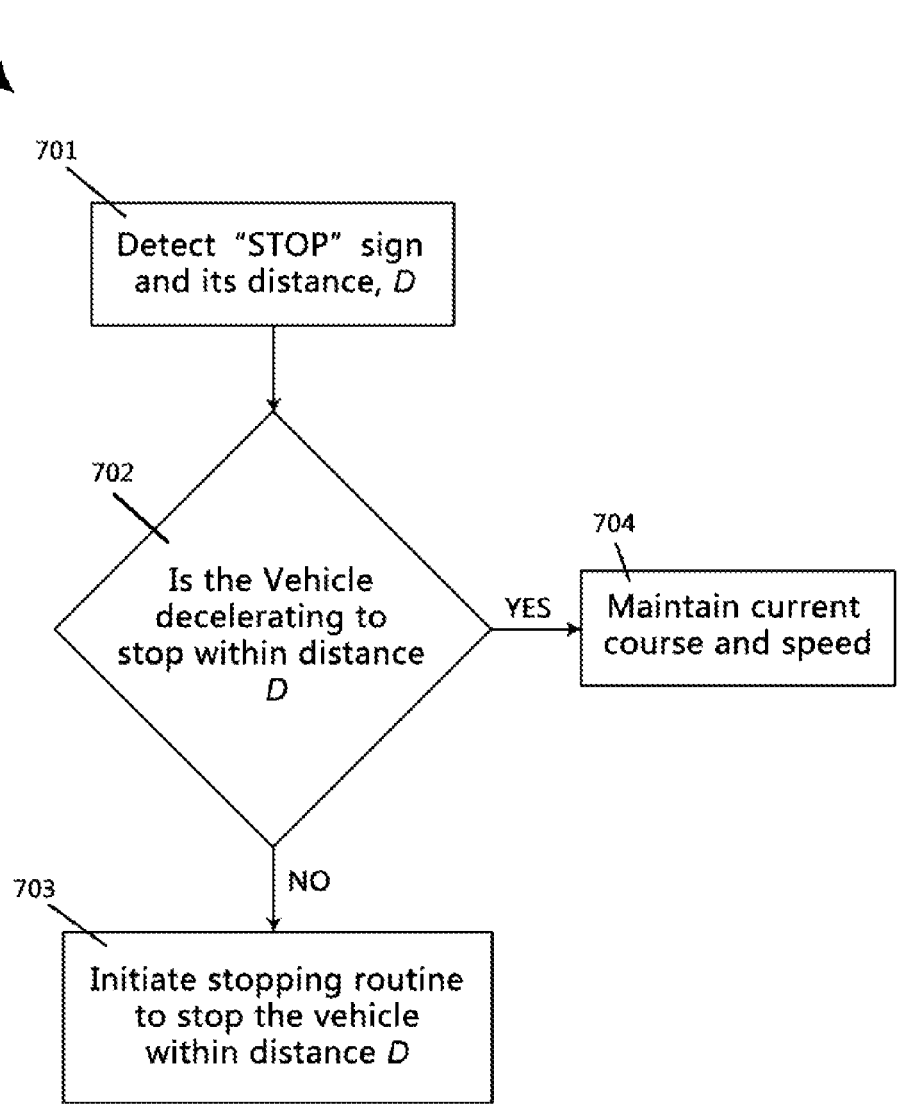
FIG. 7 is a flow chart of method to bring a moving vehicle to a complete stop at a "STOP" sign.

FIG. 7 shows a flow chart 700 of a method which can be implemented by the computer processor 1006 as programmed by computer software stored in computer memory 1010 to bring a moving vehicle, such as vehicle 210 in FIG. 2, to a complete stop at a "STOP" sign.

The flow chart 700 describes a method or routine that enables the computer processor 1006 of FIG. 10 to aid a vehicle, such as vehicle 210 of FIG. 2, in getting safely through "STOP" signs. The "STOP" signs may be equipped with special frequency sensors. Onboard sensors of sensing device 1002 in FIG. 10 on a vehicle, such as vehicle 210, detect the "STOP" sign and the distance, D, to it at step 701 and the computer processor 1006, is programmed by computer software to initiate a request or request signal in response to sensing of the STOP sign by sensing device 1002, at step 702 to check whether the vehicle 210 is decelerating to stop, such as checking speeds at different times provided by speed detector 1026, before reaching the stop sign. If "yes" (the vehicle 210 is decelerating) no further action is taken in this routine, by the computer processor 1006 at step 704. If not, at step 703, the computer processor 1006 initiates a routine or method to stop the vehicle 210 within appropriate distance of the STOP sign. The computer processor 1006 may cause the braking device 1018 to stop the vehicle 210.

Figure 8:
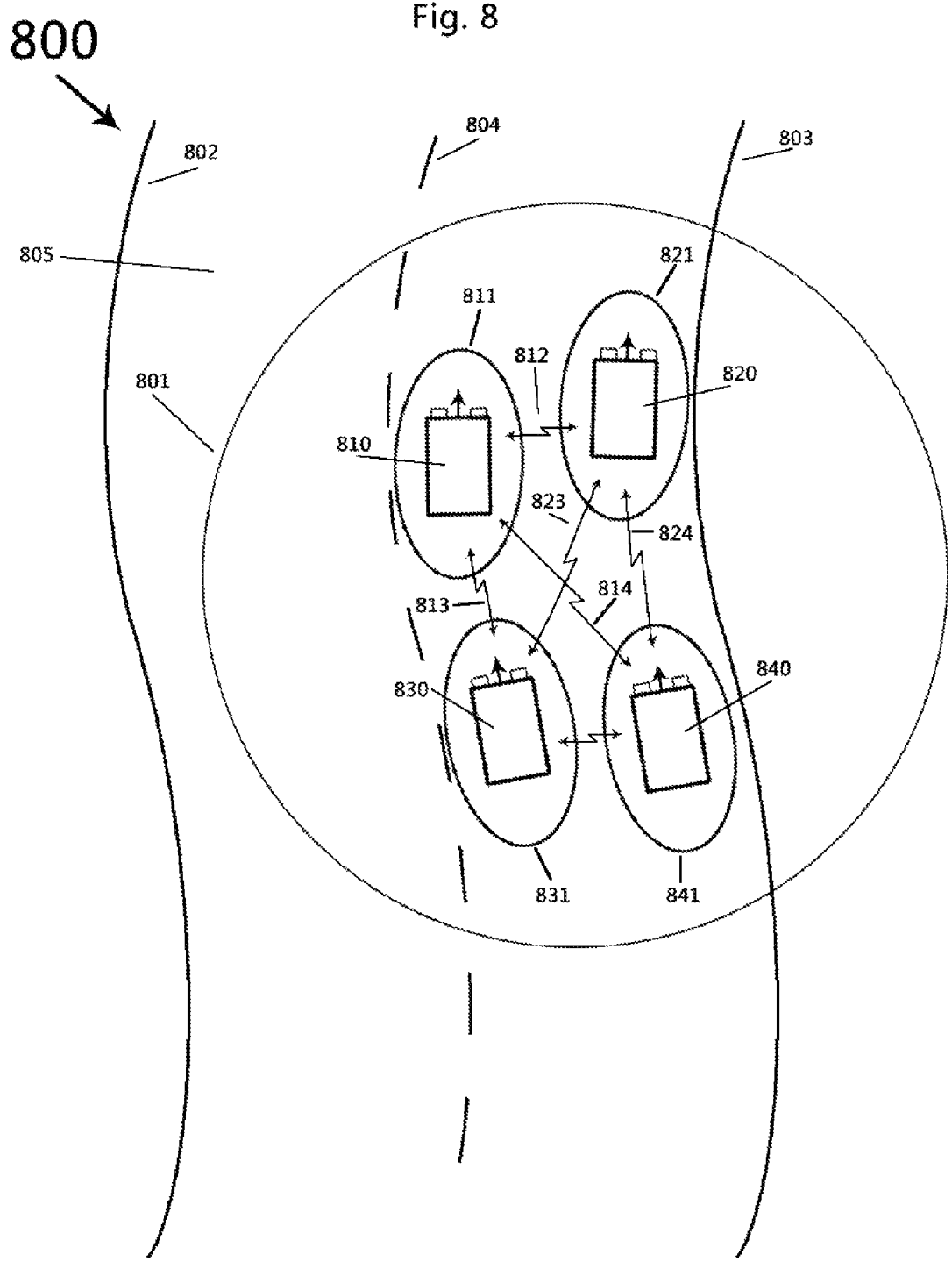
FIG. 8 illustrates a typical road condition with several vehicles forming an active forward swarm and moving together as a pack with an onboard apparatus of each vehicle measuring the distances and velocities of all other vehicles within each vehicle's swarm circle to maintain the minimum distance requirement.

FIG. 8 shows a diagram 800 illustrating a typical road condition with several vehicles forming an active forward swarm and moving together as a pack with each vehicle having an onboard apparatus, similar or identical to the apparatus 1000 shown in FIG. 10, measuring the distances and velocities of all other vehicles within its swarm circle to maintain the minimum distance requirement.

The diagram 800 in FIG. 8 illustrates a multiple vehicle situation where all vehicles within a closed region such as 801 are equipped with the proposed invention so that their onboard computer can communicate with each other generating an active forward swarm. The diagram 800 shows road boundaries 802, 803 and the dividing center line 804, as well as vehicles 810, 820, 830, 840 with their respective inner regions 811, 821, 831, and 841. The onboard computer processor each vehicle (of 810, 820, 830 and 840) (analagous to computer processor 1006) communicate with the other computer processors of the other vehicles (of 810, 820, 830, and 840) so that communication link 812 represents the communication link between vehicle 810 and vehicle 820, communication link 824 represents the communication link between vehicle 820 and vehicle 840, communication link 813 represents the communication link between vehicle 810 and vehicle 830, communication link 823 represents the communication link between vehicle 820 and vehicle 830, and communication link 814 represents the communication link between vehicle 810 and vehicle 840.

In the case shown by FIG. 8, the vehicles 810, 820, 830, and 840 form a "forward swarm" mode, since they are travelling in substantially the same direction, and can travel together as one pack through the road, each of 810, 820, 830, and 840 using its own apparatus, identical or similar to apparatus 1000 of FIG. 10, in one or more embodiments of the present invention. The behavior of the "forward swarm" or group of vehicles will be similar to a "pack of wolves' traveling together, avoiding collision by maintaining a minimum distance between all of the vehicles (810, 820, 830 and 840) using their respective onboard computer processors (analagous to 1006) and sensing devices (analagous to 1002). If all the vehicles are in the "forward swarm" mode as in FIG. 8, then they are synchronized to the speed of the lead vehicle or to that of the vehicle immediately in front of it, or the nearest vehicle in front of it subject to the minimum distance requirement between vehicles described earlier. In the example of FIG. 8, the vehicle 820, which is in the "lead" in the direction in which the swarm of swarm circle 801 is moving, is the lead vehicle. In this case, for vehicle 810, its nearest neighbor that is ahead of it, also happens to be the lead vehicle 820. However, for vehicle 830, the nearest neighbor that is immediately ahead of it is vehicle 810, and vehicle 830 may follow the lead of vehicle 810.

If there are multiple lead vehicles, then a simple protocol or method such as the "left lane vehicle has priority in establishing the cruising speed" is established in at least one embodiment by the computer processor 1006 or by a combination of computer processors analagous to 1006 of all the vehicles in the swarm circle 801. This allows a chain of vehicles all switched to "forward swarm" mode to travel together automatically and in principle, the swarm circle 801 can be quite large allowing a large number of vehicles to be part of the "forward swarm" pack. In practice the "forward swarm" pack of vehicles should follow a single lane when two forward lanes are available, or form a two lane pack if more than two lanes are available for forward motion, so that if a vehicle decides to get off the pack, it can move right and let the pack pass or accelerate away. The single line formation also allows the pack to move and pass other slowly moving vehicles on the highway, or lets other fast moving vehicles get past beyond the swarm that is cruising under the lead vehicle command.

Figure 9:
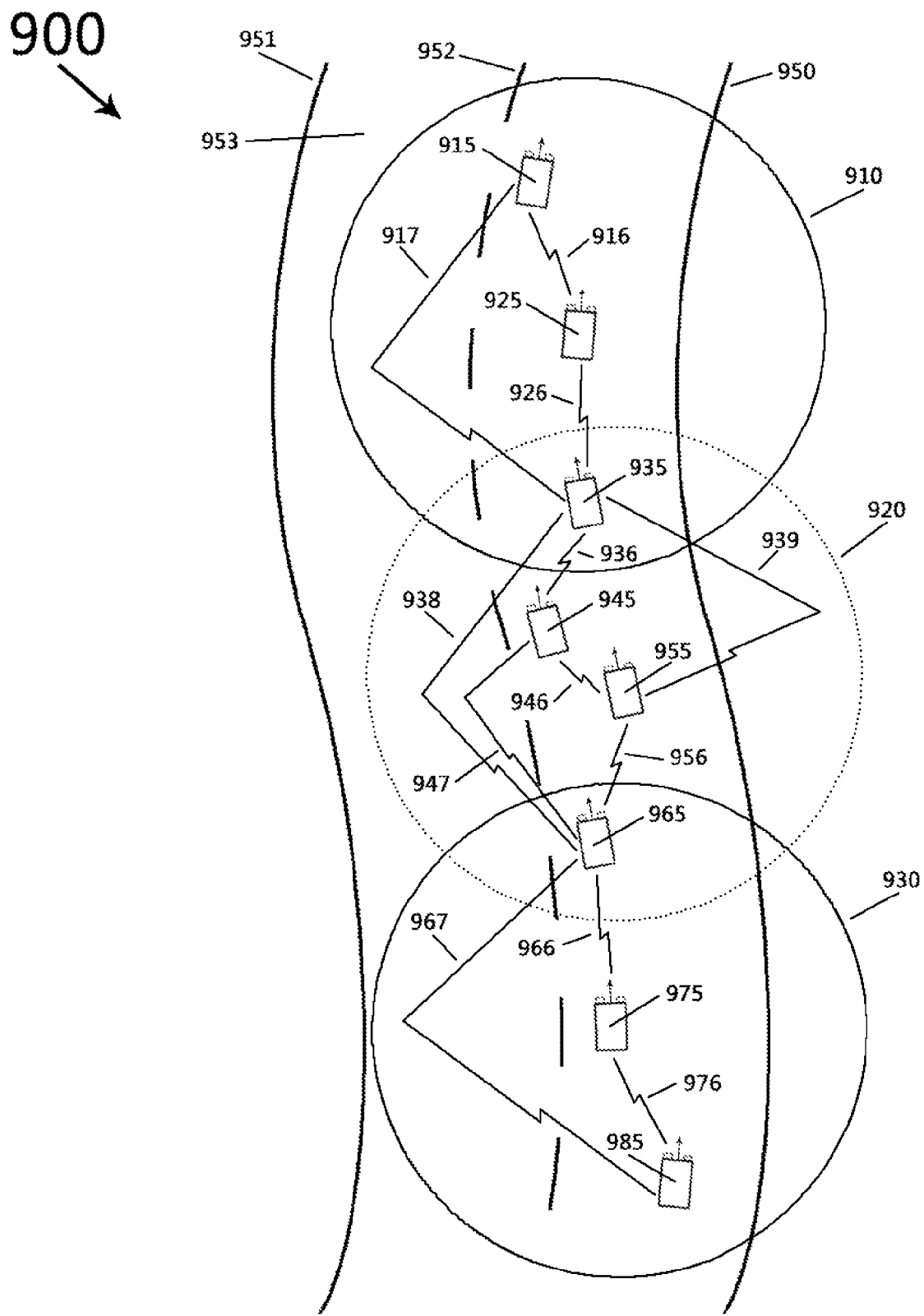
FIG. 9 illustrates a typical road condition with several vehicles across multiple swarms are effectively coupled together to form a single pack.

FIG. 9 is a diagram 900 illustrating a typical road condition with several vehicles across multiple swarms are effectively coupled together to form a single pack. The diagram 900 shows swarm circles 910, 920, and 930. Road boundaries 951, 950, and center dividing line 952 are also shown in FIG. 9. FIG. 9 also shows vehicles 915, 925, 935, 945, 955, 965, 975, and 985. Communications link 917 (between vehicle 915 and 935), communication link 916 (between vehicle 915 and 925), communication link 926 between vehicle 925 and 935), communication link 936 (between vehicle 935 and 945), communication link 946 (between vehicle 945 and 955), communication link 938 (between vehicle 935 and 965), communication link 947 (between vehicle 945 and 965), communication link 956 (between vehicle 955 and 965), communication link 939 (between vehicle 935 and 955), communication link 967 (between vehicle 965 and 985), communication link 966 (between vehicle 965 and 975), communication link 976 (between vehicle 975 and 985) are also shown in FIG. 9. Each of the communication links may be between a transmitter/receiver, analagous to 1014 of FIG. 10 of one vehicle and a transmitter/receiver, analagous to 1014 of FIG. 10 of another vehicle.

The diagram 900 illustrates a multiple vehicle situation moving along substantially the same direction where vehicles across overlapping swarms are coupled together to synchronize and move at the same speed to form an "active forward swarm (AFS)". For example, swarm or swarm circle 910 overlaps with swarm or swarm circle 920. Vehicle 935 is in both swarm circles 910 and 920. In at least one embodiment vehicle 935 (which is "across overlapping swarms") is coupled or in communication with vehicle 925 (via communication link 926) in swarm 910 and is coupled or in communication with vehicle 945 (via communication link 936) in swarm 920.

In addition to keeping the inner region of each vehicle, such as vehicle 915, free of other vehicles, when the vehicles are in the AFS mode, they synchronize their speed or velocity with their nearest forward neighbor (forward in the direction in which they are travelling), or the immediate lead vehicle. In this concept, vehicle 925 has a swarm circle marked 910, vehicle 955 has a swarm circle 920, and vehicle 975 has a swarm circle 930, wherein the swarm circles 910 and 920 overlap, the swarm circles 920 and 930 overlap, and the swarm circles 910 and 930 do not overlap. Vehicles 915 and 935 are within the swarm circle 910. Vehicles 935, 945 and 965 are within the swarm circle 920 of vehicle 955. Similarly vehicles 965 and 985 are within the swarm circle 930 of vehicle 975.

Vehicles 915, 925 and 935 within the swarm circle 910 communicate with each other using the appropriate communication links of 916, 917 and 926. Vehicles 935, 945, 955 and 965 within the swarm circle 920 communicate with each other using the appropriate communication links of 936, 937, 938, 946, 947 and 956. Similarly vehicles 965, 975 and 985 within the swarm circle 930 communicate with each other using the appropriate communication links of 966, 977 and 976. Thus, in effect vehicle 915 in swarm circle or region 910 is connected via communication links to vehicle 985 in swarm circle or region 930, although those two swarm circles or regions are not overlapping. The communication will include each vehicle in the swarm recognizing all other vehicles and synchronizing each vehicle speed to match their immediate lead neighbor's speed. Thus, vehicle 955 will match the speed of its immediate lead vehicle 945, whereas vehicle 945 will match the speed of vehicle 935, while maintaining all other minimum distance requirements among vehicles as described earlier. If by unavoidable circumstances, such as vehicle 965 slowing down or getting off the swarm, the swarm circle 930 ceases to overlap with the swarm circles 910 and 920. In that case, the active forward swarm shrinks to those vehicles within the tow overlapping swarm circles 910 and 920 only, and vehicles within 930 forms another swarm or eventually may catch up with 910 and 920 forming another active forward swarm. Similarly other vehicles can join or leave the active forward swarm shown in FIG. 9 at any time after appropriately warning other members in that active swarm. The active forward swarm is a dynamic ever evolving entity that accepts and lets go moving vehicles in and out of the swarm while moving as a pack forward and maintaining the minimum distance requirement within each of the inner circles of the vehicles within the swarm.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A method comprising:
using a first computer processor on a first vehicle to cause a first communication signal to be transmitted from the first vehicle to a second computer processor on a second vehicle;
monitoring a velocity and a distance from a first vehicle of one or more vehicles within a first distance of the first vehicle with a first computer processor on the first vehicle, while not monitoring any vehicles outside of the first distance of the first vehicle;
monitoring a velocity and a distance from a second vehicle of one or more vehicles within a second distance of a second vehicle with a second computer processor on the second vehicle, while not monitoring any vehicles outside of the second distance of the second vehicle;
wherein at least one of the one or more vehicles within the second distance of the second vehicle is outside of the first distance of the first vehicle;
wherein the first communication signal provides a first instruction to the second vehicle to move in a first manner; and
further comprising using the second computer processor on the second vehicle to cause the second vehicle to move in the first manner in response to the first instruction;
and in response to the first instruction, causing the second vehicle to instruct the at least one of the one or more vehicles within the second distance of the second vehicle but outside of the first distance of the first vehicle to move in the first manner.

2. The method of claim 1 wherein,
the first instruction to the second vehicle to move in the first manner instructs the second vehicle to slow down.

3. The method of claim 1 wherein,
the transmitting of the first communication signal from the first vehicle to the second computer processor on the second vehicle is done after and only if the first computer processor determines that the first vehicle is not allowed to move in a second manner.

4. The method of claim 1 wherein:
the first instruction to the second vehicle to move in the first manner instructs the second vehicle to accelerate.

5. The method of claim 1 wherein:
the first instruction to the second vehicle to move in the first manner instructs the second vehicle to change direction of movement of the second vehicle.

6. The method of claim 1 wherein,
the first instruction to the second vehicle to move in the first manner instructs the second vehicle to steer the second vehicle in a particular direction.

7. A method comprising:
using a first computer processor on a first vehicle to communicate with a second computer processor on a second vehicle;
monitoring a velocity and a distance from a first vehicle of one or more vehicles within a first distance of the first vehicle with a first computer processor on the first vehicle, while not monitoring any vehicles outside of the first distance of the first vehicle;
monitoring a velocity and a distance from a second vehicle of one or more vehicles within a second distance of a second vehicle with a second computer processor on the second vehicle, while not monitoring any vehicles outside of the second distance of the second vehicle;
wherein at least one of the one or more vehicles within the second distance of the second vehicle is outside of the first distance of the first vehicle;
using a common pre-determined protocol as programmed by computer software to decide a combined movement of the first vehicle and the second vehicle based on the communication of the first computer processor on the first vehicle with the second computer processor on the second vehicle;
and in response to the first instruction, causing the second vehicle to instruct the at least one of the one or more vehicles within the second distance of the second vehicle but outside of the first distance of the first vehicle to move in the first manner.

8. The method of claim 7 wherein,
the combined movement of the first vehicle and the second vehicle is determined so as to maintain an inner region for each of the first vehicle and the second vehicle free from the other vehicle of the first and the second vehicle and free from any other vehicle.

9. The method of claim 8 wherein,
the inner region of the first vehicle is an elliptical area having its center as the center of the first vehicle;
and wherein the inner region of the second vehicle is an elliptical area having its center as the center of the second vehicle.

10. A method comprising:
monitoring a velocity and a distance from a first vehicle of one or more vehicles within a first distance of the first vehicle with a first computer processor on the first vehicle, while not monitoring any vehicles outside of the first distance of the first vehicle;
monitoring a velocity and a distance from a second vehicle of one or more vehicles within a second distance of a second vehicle with a second computer processor on the second vehicle, while not monitoring any vehicles outside of the second distance of the second vehicle;
wherein at least one of the one or more vehicles within the second distance of the second vehicle is outside of the first distance of the first vehicle;
further comprising causing the first vehicle to send a first request to the second vehicle to move in a first manner;
and in response to the first request, causing the second vehicle to request the at least one of the one or more vehicles within the second distance of the second vehicle but outside of the first distance of the first vehicle to move in the first manner.

11. The method of claim 10 wherein,
to move in the first manner includes to slow down.

12. A method comprising:
using communications between a first computer processor on a first vehicle and a second computer processor on a second vehicle to synchronize a speed of the first vehicle to be about equal to a speed of the second vehicle subject to a minimum distance requirement between the first vehicle and the second vehicle;

monitoring a velocity and a distance from a first vehicle of one or more vehicles within a first distance of the first vehicle with a first computer processor on the first vehicle, while not monitoring any vehicles outside of the first distance of the first vehicle;

monitoring a velocity and a distance from a second vehicle of one or more vehicles within a second distance of a second vehicle with a second computer processor on the second vehicle, while not monitoring any vehicles outside of the second distance of the second vehicle;

wherein at least one of the one or more vehicles within the second distance of the second vehicle is outside of the first distance of the first vehicle;

further comprising causing the first vehicle to send a first request to the second vehicle to move in a first manner;

and in response to the first request, causing the second vehicle to request the at least one of the one or more vehicles within the second distance of the second vehicle but outside of the first distance of the first vehicle to move in the first manner.

13. The method of claim 12 further comprising:

using communications between a third computer processor on a third vehicle and the second computer processor on the second vehicle to synchronize a speed of the third vehicle to be about equal to a speed of the second vehicle subject to a minimum distance requirement between the third vehicle and the second vehicle;

wherein communications, if any, between the first computer processor and the third computer processor are not used to synchronize the speed of the third vehicle to be about equal the speed of the second vehicle subject to the minimum distance requirement between the third vehicle and the second vehicle.

14. The method of claim 9 wherein:

the second vehicle and the first vehicle are travelling on the same road, and in substantially the same direction; and the second vehicle is ahead of the first vehicle on the road.

15. An apparatus comprising:

a first computer processor located on a first vehicle;
a second computer processor located on a second vehicle;
wherein the first computer processor is programmed to:
cause a first communication signal to be transmitted from the first vehicle to a the second computer processor on the second vehicle;
monitor a velocity and a distance from the first vehicle of one or more vehicles within a first distance of the first vehicle, while not monitoring any vehicles outside of the first distance of the first vehicle;
wherein the first communication signal provides a first instruction to the second vehicle to move in a first manner; and
wherein the second computer processor is programmed to:
cause the second vehicle to move in the first manner in response to the first instruction;
monitor a velocity and a distance from the second vehicle of one or more vehicles within a second distance of a second vehicle, while not monitoring any vehicles outside of the second distance of the second vehicle;
wherein at least one of the one or more vehicles within the second distance of the second vehicle is outside of the first distance of the first vehicle;
and in response to the first manner, the second computer processor is programmed to request the at least one of the one or more vehicles within the second distance of the second vehicle but outside of the first distance of the first vehicle to move in the first manner.

16. The apparatus of claim 15 wherein,
the first instruction to the second vehicle to move in the first manner instructs the second vehicle to slow down.

17. The apparatus of claim 15 wherein,
the transmitting of the first communication signal from the first vehicle to the second computer processor on the second vehicle is done after and only if the first computer processor determines that the first vehicle is not allowed to move in a second manner.

18. The apparatus of claim 15 wherein,
the first instruction to the second vehicle to move in the first manner instructs the second vehicle to accelerate.

19. The apparatus of claim 15 wherein,
the first instruction to the second vehicle to move in the first manner instructs the second vehicle to change direction of movement of the second vehicle.

20. The apparatus of claim 15 wherein,
the first instruction to the second vehicle to move in the first manner instructs the second vehicle to steer the second vehicle in a particular direction.

21. An apparatus comprising:
a first computer processor located on a first vehicle;
a second computer processor located on a second vehicle;
wherein the first computer processor is programmed to communicate with the second computer processor;
wherein the first computer processor is programmed to monitor a velocity and a distance from the first vehicle of one or more vehicles within a first distance of the first vehicle, while not monitoring any vehicles outside of the first distance of the first vehicle;
wherein the second computer processor is programmed to monitor a velocity and a distance from the second vehicle of one or more vehicles within a second distance of a second vehicle, while not monitoring any vehicles outside of the second distance of the second vehicle;
wherein at least one of the one or more vehicles within the second distance of the second vehicle is outside of the first distance of the first vehicle;
wherein the first and the second computer processors are programmed to use a common pre-determined protocol as programmed by computer software to decide a combined movement of the first vehicle and the second vehicle based on the communication of the first computer processor on the first vehicle with the second computer processor on the second vehicle;
wherein the first computer processor is programmed to send a first request to the second vehicle to move in a first manner;
and in response to the first request, the second computer processor is programmed to request the at least one of the one or more vehicles within the second distance of the second vehicle but outside of the first distance of the first vehicle to move in the first manner.

22. The apparatus of claim 21 wherein,
the combined movement of the first vehicle and the second vehicle is determined so as to maintain an inner region for each of the first vehicle and the second vehicle free from the other vehicle of the first and the second vehicle and free from any other vehicle.

23. The apparatus of claim 22 wherein,
the inner region of the first vehicle is an elliptical area having its center as the center of the first vehicle;

and wherein the inner region of the second vehicle is an elliptical area having its center as the center of the second vehicle.

24. An apparatus comprising:

a first computer processor located on a first vehicle;

a second computer processor located on a second vehicle;

wherein the first computer processor is programmed to monitor a velocity and a distance from the first vehicle of one or more vehicles within a first distance of the first vehicle, while not monitoring any vehicles outside of the first distance of the first vehicle;

wherein the second computer processor is programmed to monitor a velocity and a distance from the second vehicle of one or more vehicles within a second distance of a second vehicle, while not monitoring any vehicles outside of the second distance of the second vehicle;

wherein at least one of the one or more vehicles within the second distance of the second vehicle is outside of the first distance of the first vehicle;

wherein the first computer processor is programmed to send a first request to the second vehicle to move in a first manner;

and in response to the first request, the second computer processor is programmed to request the at least one of the one or more vehicles within the second distance of the second vehicle but outside of the first distance of the first vehicle to move in the first manner.

25. The apparatus of claim 24 wherein, to move in the first manner includes to slow down.

26. An apparatus comprising:

a first computer processor on a first vehicle;

a second computer processor on a second vehicle; and wherein the first computer processor is programmed to monitor a velocity and a distance from the first vehicle of one or more vehicles within a first distance of the first vehicle, while not monitoring any vehicles outside of the first distance of the first vehicle;

wherein the second computer processor is programmed to monitor a velocity and a distance from the second vehicle of one or more vehicles within a second distance of a second vehicle, while not monitoring any vehicles outside of the second distance of the second vehicle;

wherein at least one of the one or more vehicles within the second distance of the second vehicle is outside of the first distance of the first vehicle;

wherein the first computer processor and the second computer processor are programmed to use communications between the first computer processor and the second computer processor to synchronize a speed of the first vehicle to be about equal to a speed of the second vehicle subject to a minimum distance requirement between the first vehicle and the second vehicle;

wherein the first computer processor is programmed to send a first request to the second vehicle to move in a first manner;

and in response to the first request, the second computer processor is programmed to request the at least one of the one or more vehicles within the second distance of the second vehicle but outside of the first distance of the first vehicle to move in the first manner.

27. The apparatus of claim 26 further comprising:

a third computer processor on a third vehicle;

wherein the second computer processor on the second vehicle and the third computer processor on the third vehicle are programmed to use communications between the third computer processor and the second computer processor to synchronize a speed of the third vehicle to be about equal to a speed of the second vehicle subject to a minimum distance requirement between the third vehicle and the second vehicle; and wherein communications, if any, between the first computer processor and the third computer processor are not used to synchronize the speed of the third vehicle to be about equal the speed of the second vehicle subject to the minimum distance requirement between the third vehicle and the second vehicle.

28. The apparatus of claim 26 wherein, the second vehicle and the first vehicle are travelling on the same road, and in substantially the same direction; and the second vehicle is ahead of the first vehicle on the road.

* * * * *